United States Patent [19]
Millis, Jr.

[11] Patent Number: 5,369,654
[45] Date of Patent: Nov. 29, 1994

[54] FAULT TOLERANT GATE ARRAY USING DUPLICATION ONLY

[75] Inventor: Hugh L. Millis, Jr., Placentia, Calif.

[73] Assignee: Rockwell International Corporation, Seal Beach, Calif.

[21] Appl. No.: 902,639

[22] Filed: Jun. 23, 1992

Related U.S. Application Data

[63] Continuation-in-part of Ser. No. 300,465, Jan. 23, 1989, abandoned.

[51] Int. Cl.[5] .......................... G06F 7/02; H04L 1/00
[52] U.S. Cl. .................................... 371/68.1; 371/67.1
[58] Field of Search ..................... 371/68.1, 67.1, 36, 371/8.1, 68.3

[56] References Cited

U.S. PATENT DOCUMENTS

| | | | |
|---|---|---|---|
| 3,517,174 | 1/1970 | Ossfeldt | 235/153 |
| 3,859,513 | 1/1975 | Chuang et al. | 235/153 AE |
| 3,890,493 | 6/1975 | Burtness et al. | 235/153 AE |
| 4,200,225 | 4/1980 | Ueno et al. | 371/27 |
| 4,621,201 | 11/1986 | Amdahl et al. | 307/219 |
| 4,713,606 | 12/1987 | Laviron | 324/73 R |
| 4,903,270 | 2/1990 | Johnson et al. | 371/68.1 |

Primary Examiner—Robert W. Beausoliel, Jr.
Assistant Examiner—Joseph E. Palys
Attorney, Agent, or Firm—H. Fredrick Hamann; George A. Montanye; Tom Streeter

[57] ABSTRACT

The FAULT TOLERANT GATE ARRAY USING DUPLICATION ONLY shown here renders AND-drives-OR, and OR-drives-AND, gate arrays as fault tolerant as when triplicated, but does so by only duplicating the array. A test input is added to each of gates of the bottom tier of the two arrays. When a test signal is applied, the same output should be produced by both arrays. This output should be the same as an expected test output, which is known in advance. When the test signal is withdrawn, the two arrays should continue to produce the same output as each other, although it may or may not be the same as the output under test. If any of these three conditions is not met, the failure may be used to determine the correct output, the failed array, and the nature of the failure.

15 Claims, 7 Drawing Sheets

| LINE | A TEST | B TEST | A OP | B OP | A STATUS | B STATUS | CORRECT OUTPUT | DEFECTIVE ARRAY | PROBLEM | COMMENT |
|------|--------|--------|------|------|----------|----------|----------------|-----------------|---------|---------|
| 0 | 0 | 0 | 0 | 0 | OK/S0 | OK/S0 | 0 | NONE | NONE | BOTH OK |
| 1 | 0 | 0 | 0 | 1 | S0 | OK | 1 | A | S0 | B OK |
| 2 | 0 | 0 | 1 | 0 | OK | S0 | 1 | B | S0 | A OK |
| 3 | 0 | 0 | 1 | 1 | OK | OK | 1 | NONE | NONE | BOTH OK |
| 4 | 0 | 1 | 0 | 0 | OK/S0 | DEF | 0 | B | UNK | ULTRA-RARE |
| 5 | 0 | 1 | 0 | 1 | OK/S0 | DEF/S1 | 0 | B | S1 | A OK |
| 6 | 0 | 1 | 1 | 0 | OK | DEF | 1 | B | UNK | ULTRA-RARE |
| 7 | 0 | 1 | 1 | 1 | OK | DEF/S1 | 1 | B | S1 | A OK |
| 8 | 1 | 0 | 0 | 0 | DEF | OK/S0 | 0 | A | UNK | ULTRA-RARE |
| 9 | 1 | 0 | 0 | 1 | DEF | OK | 1 | A | UNK | ULTRA-RARE |
| 10 | 1 | 0 | 1 | 0 | DEF/S1 | OK/S0 | 0 | A | S1 | B OK |
| 11 | 1 | 0 | 1 | 1 | DEF/S1 | OK | 1 | A | S1 | B OK |
| 12 | 1 | 1 | 0 | 0 | DEF | DEF | HALT | BOTH | UNK | ULTRA-RARE |
| 13 | 1 | 1 | 0 | 1 | DEF | DEF/S1 | HALT | BOTH | S1(B) | ULTRA-RARE |
| 14 | 1 | 1 | 1 | 0 | DEF/S1 | DEF | HALT | BOTH | S1(A) | ULTRA-RARE |
| 15 | 1 | 1 | 1 | 1 | DEF/S1 | DEF/S1 | HALT | BOTH | S1(BOTH) | ULTRA-RARE |

| LINE | A TEST | B TEST | A OP | B OP | A STATUS | B STATUS | CORRECT OUTPUT | DEFECTIVE ARRAY | PROBLEM | COMMENT |
|---|---|---|---|---|---|---|---|---|---|---|
| HARD FAILURE | | | | | | | | | | |
| 1 | 0 | 0 | 0 | 1 | S0 | OK | 1 | A | S0 | B OK |
| 2 | 0 | 0 | 1 | 0 | OK | S0 | 1 | B | S0 | A OK |
| 7 | 0 | 1 | 1 | 1 | OK | DEF/S1 | 1 | B | S1 | A OK |
| 11 | 1 | 0 | 1 | 1 | DEF/S1 | OK | 1 | A | S1 | B OK |
| OK, FULLY TESTED | | | | | | | | | | |
| 3 | 0 | 0 | 1 | 1 | OK | OK | 1 | NONE | NONE | BOTH OK |
| NO ERROR, POSSIBILITY OF FAULT: | | | | | | | | | | |
| 0 | 0 | 0 | 0 | 0 | OK/S0 | OK/S0 | 0 | NONE | NONE | BOTH OK |
| ALL OTHER — DOUBLE FAULT OR UNDEFINED: | | | | | | | | | | |
| 4 | 0 | 1 | 0 | 0 | OK/S0 | DEF | 0 | B | UNK | ULTRA-RARE |
| 5 | 0 | 1 | 0 | 1 | OK/S0 | DEF/S1 | 0 | B | S1 | A OK |
| 6 | 0 | 1 | 1 | 0 | OK | DEF | 1 | B | UNK | ULTRA-RARE |
| 8 | 1 | 0 | 0 | 0 | DEF | OK/S0 | 0 | A | UNK | ULTRA-RARE |
| 9 | 1 | 0 | 0 | 1 | DEF | OK | 1 | A | UNK | ULTRA-RARE |
| 10 | 1 | 0 | 1 | 0 | DEF/S1 | OK/S0 | 0 | A | S1 | B OK |
| 12 | 1 | 1 | 0 | 0 | DEF | DEF | HALT | BOTH | UNK | ULTRA-RARE |
| 13 | 1 | 1 | 0 | 1 | DEF | DEF/S1 | HALT | BOTH | S1(B) | ULTRA-RARE |
| 14 | 1 | 1 | 1 | 0 | DEF/S1 | DEF | HALT | BOTH | S1(A) | ULTRA-RARE |
| 15 | 1 | 1 | 1 | 1 | DEF/S1 | DEF/S1 | HALT | BOTH | S1(BOTH) | ULTRA-RARE |

5,369,654

FAULT TOLERANT GATE ARRAY USING DUPLICATION ONLY

The present application is a continuation in part of Applicant's parent application Ser. No. 07/300,465, filed Jan. 23, 1989, now abandoned, also entitled "Fault Tolerant Gate Array Using Duplication Only," the disclosure of which is hereby incorporated herein by reference.

BACKGROUND OF THE INVENTION

Figure 1:
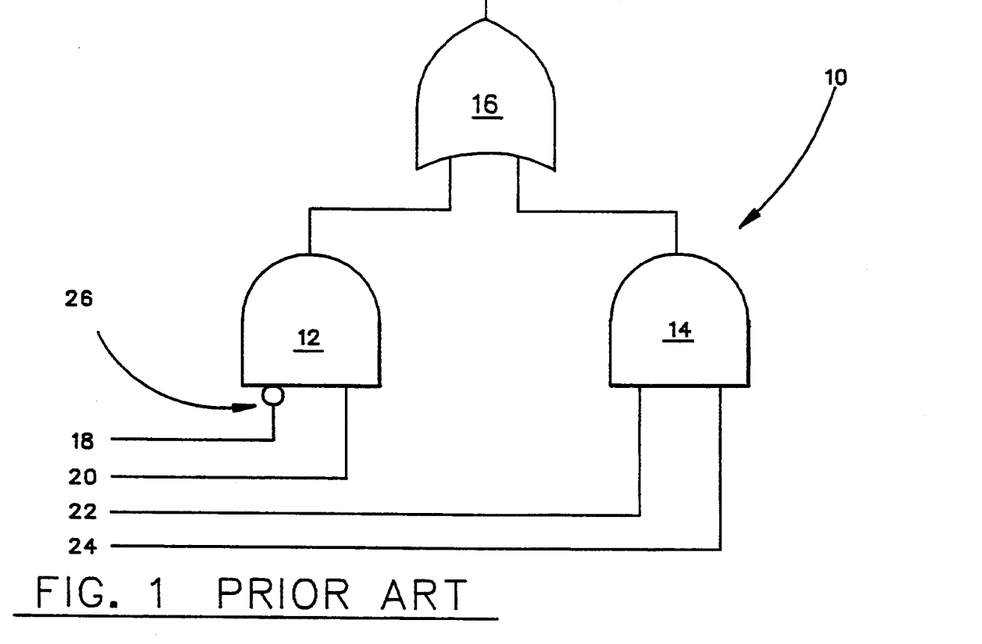
FIG. 1 shows a prior art AND-drives-OR gate array.

A very common gate array 10 is shown in FIG. 1, namely, a plurality of AND gates 12-14 driving an OR gate 16. The AND gates 12-14 have a plurality of inputs 18-24. An inverter 26 inverts input 18. Only two AND gates are shown. and each has only two inputs, and only one input is inverted, t8 but, in practice, rather large numbers of AND gates, inputs, and inverters may be supported. With a sufficiently large number of AND gates, inputs, and inverters on selected inputs, any reasonable Boolean output can be produced.

Figure 2:
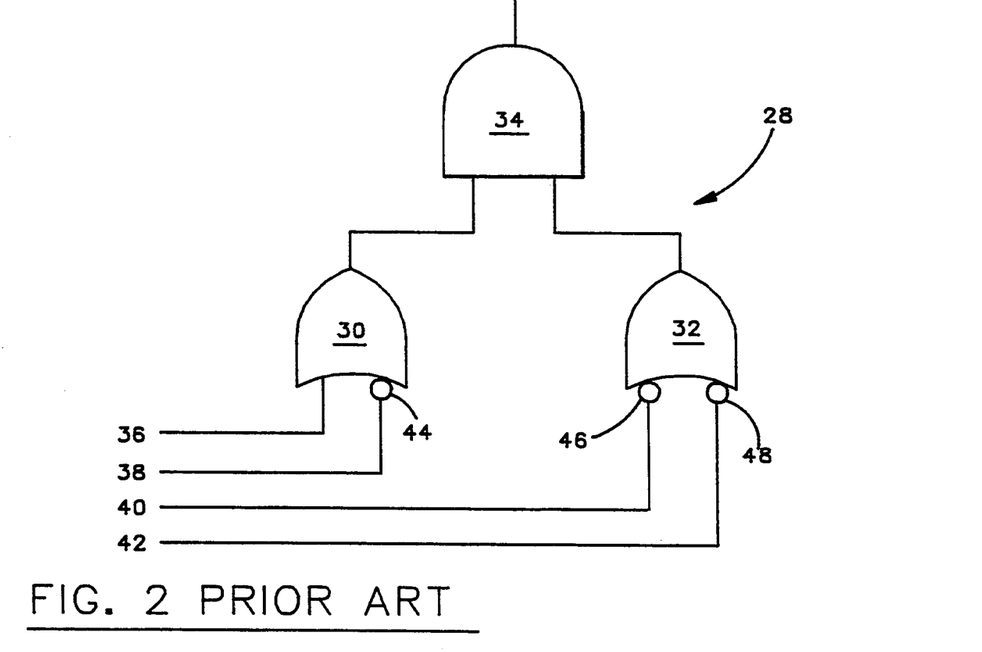
FIG. 2 shows a prior art OR-drives-AND gate array.

FIG. 2 shows the inverse 28 of array 10, with the AND gates 12-14 being replaced with OR gates 30-32, the OR gate 16 being replaced with an AND gate 34, and the inputs 18-24 being replaced with inputs 36-42. Input 36, corresponding to input 18, does NOT include an inverter corresponding to inverter 26. Inputs 38-42, corresponding to inputs 20-24, DO include inverters 44-48. If identical signals are applied to inputs 18-24 as are applied to inputs 36-42, the output of gate 34 will be the inverse of the output of gate 16.

Figure 3:
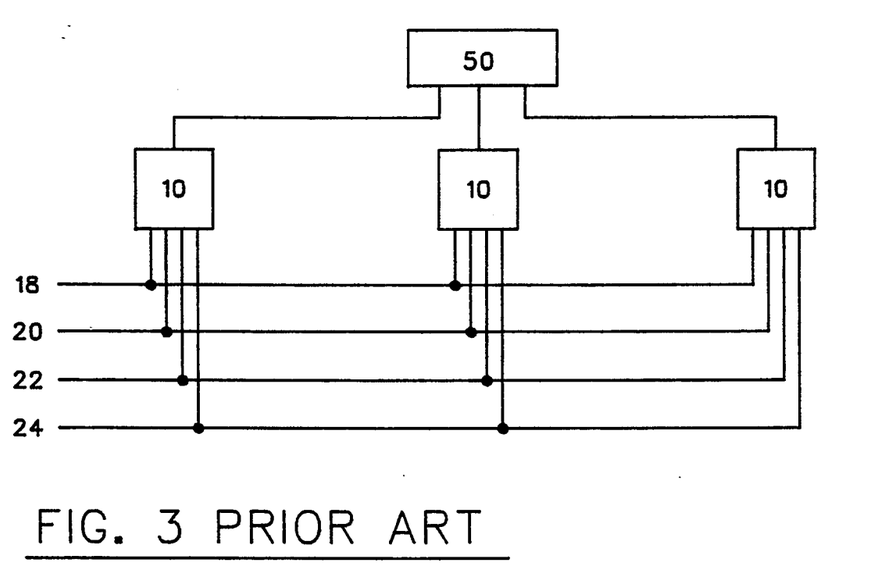
FIG. 3 shows a prior art array triplication and voting circuit.

Unfortunately, all of the gates are subject to failure, and this failure may be difficult to detect. FIG. 3 shows the conventional way: triplicate array 10, apply the same inputs 18-24 to each array, and apply the outputs of the arrays to a voting circuit 50. If all three inputs to the voting circuit 50 are the same, that common input is the output of the voting circuit 50. If they disagree, then the majority input is the voting circuit's output, and the array producing the minority input is marked for possible replacement. If desired, one or more of the arrays 10 may be replaced with its inverse 28, and the voting circuit 50 modified accordingly.

The conventional method produces reliability at the expense of tripling the cost, bulk, weight, and power consumption of the array 10. It is desirable to eliminate. or at least reduce, this tripling.

SUMMARY OF THE INVENTION

It is an objective of the present invention to produce the reliability which heretofore has required triplication of the array, and to do so by only duplicating the array. This objective is obtained by adding a test input to each of gates of the bottom tier of the two arrays. When a test signal is applied, the same output should be produced by both arrays. This output should be the same as an expected test output, which is known in advance. When the test signal is withdrawn, the two arrays should continue to produce the same output as each other, although it may or may not be the same as the output under test. If any of these three conditions is not met, the failure may be used to determine the correct output, the failed array, and the nature of the failure.

DETAILED DESCRIPTION OF THE DRAWINGS

Figure 4:
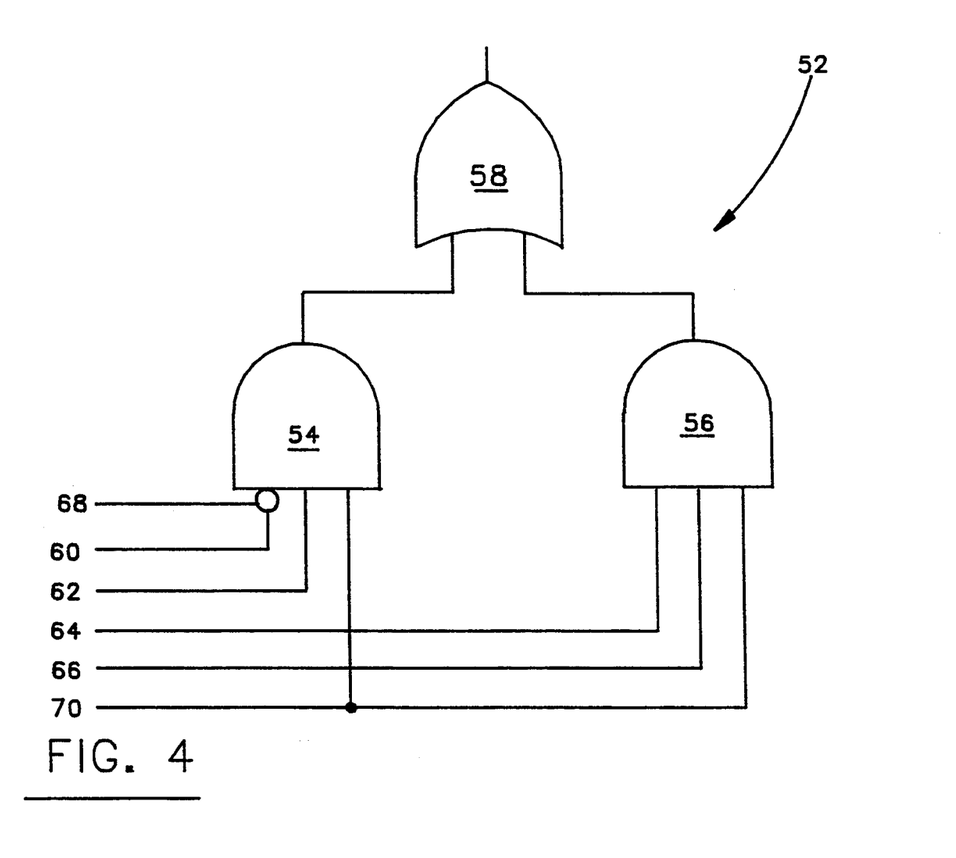
FIG. 4 shows an AND-drives-OR gate array according to the present invention.

FIG. 4 shows an AND-drives-OR gate array 52 according to the present invention. It is identical to the prior art AND-drives-OR array 10 of FIG. 1 (and can be expanded beyond the two gates, four Inputs, and one inverter shown), and comparable components are comparably numbered (incremented by 42), with two exceptions. First, each of the AND gates 54–56 includes a extra input; and, second, this extra input is connected to a test input 70. When a 0 is applied to test input 70, both AND gates 54–56 should produce a 0 output (regardless of what is being applied to operating inputs 60–66), and this totally 0 input to OR gate 58 should produce a 0 output from OR gate 58.

In the AND-drives-OR array 52 of FIG. 4, the AND gates 54–56 may be replaced with NOR gates since both gates are primarily 0-output gates. That is, only one input combination produces a 1; all others produce a 0. The logic mechanized with NOR gates will, of course, be different from that mechanized with AND gates, but the top tier OR gate 58 is the same and the test inputs 70 are the same. Whether AND gates or NOR gates are used, a 0 should be produced by all of the bottom tier gates when a test signal is applied, and this 0 should be propagated through the top tier OR gate 58 to produce another 0. Much as the logic mechanized with NOR gates is different from that mechanized with AND gates, the test signal to be applied to the test input of a NOR gate is different from the test signal to be applied to be applied to an AND gate. That is, a 0 must be applied to an AND test input to force a 0 output, regardless of the signals applied to the operating inputs; a 1, in contrast, must be applied to a NOR test input to force the same 0 output.

An inverter may be attached to the output of an OR gate to convert it to a NOR gate before placing it in service as a bottom tier gate. Equivalently, the inverter may be attached to the input of the top tier OR gate 58, or may even be a separate device located between the tiers.

As noted above, the bottom tier AND gates 54–56 may be changed to NOR gates when a change of the logic to me mechanized requires this change of gates. Likewise, the top tier OR gate 58 may be changed to a NAND gate when a comparable change in the logic to be mechanized occurs, since both gates are primarily 1-output gates. The phrase "AND gate" therefore includes the phrase "NOR gate," within the meaning of the present invention, and the phrase "NAND gate" includes the phrase "OR gate." The phrase "OR-drives-AND array" must be similarly construed.

Figure 5:
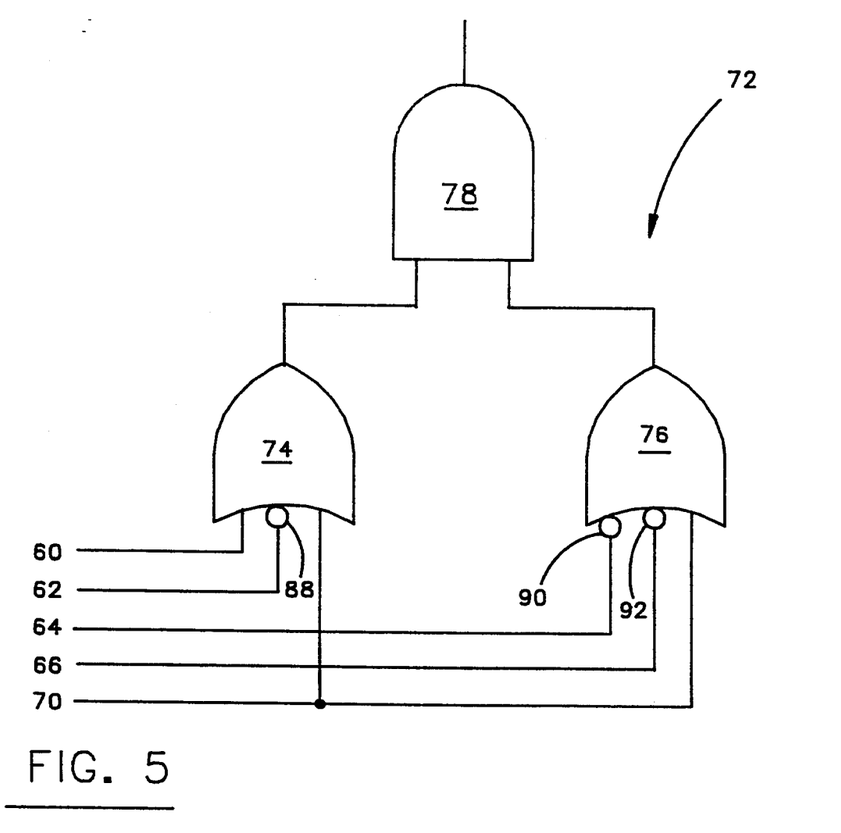
FIG. 5 shows an OR-drives-AND gate array according to the present invention.

FIG. 5 shows the present invention's OR-drives-AND gate array 72. It bears the same relation to the prior art OR-drives-AND array 28 of FIG. 2 as the present invention's AND-drives-OR array 52 of FIG. 4 bears to the prior art AND-drives-OR array 10 of FIG. 1. Here, the test signal to be applied to the test input 94 is a 1, and a 1 should be produced under test.

The equivalence of AND and NOR, and the comparable equivalence of NAND and OR, shown in the FIG. 4 AND-drives-OR array applies with equal force to the FIG. 5 OR-drives-AND array, and a comparably broad construction of these terms is intended in both arrays.

Figure 6:
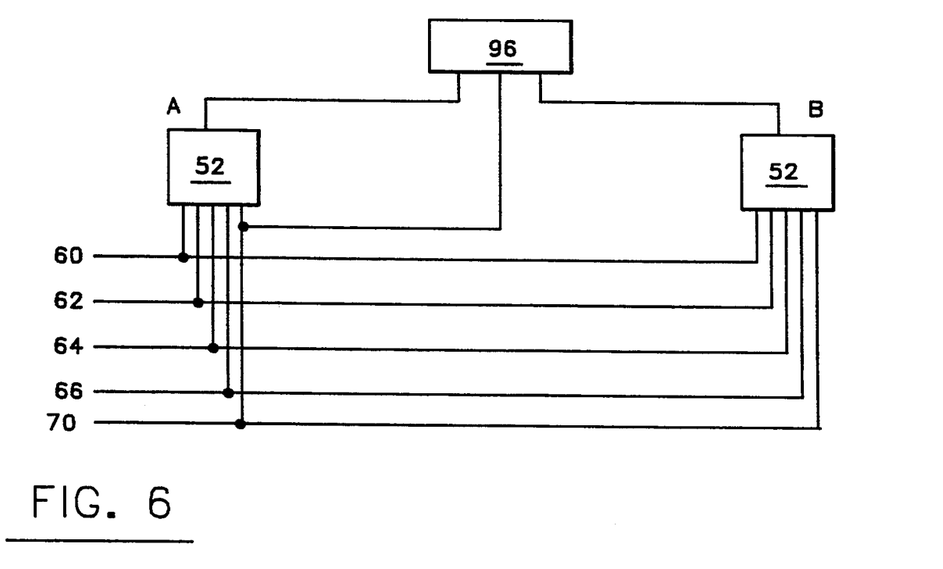
FIG. 6 shows a pair of FIG. 4 AND-drives-OR gate arrays driving an error handling device.

FIG. 6 shows one duplicated embodiment of the present invention. Two identical AND-drives-OR arrays 52 (differentiated by the letters A and B) are jointly driven by operating inputs 60–66 and test input 70. An error handling device 96, described in greater detail below, checks to make sure that the output of array A is the same as the output of array B, both in operation (1 applied to test input 70) and under test (0 applied to test input 70). Test input 70 also drives the error handling device 96. Error handling device 96 further checks to make sure that, when the arrays A and B are under test and produce the same output, that this output is a 0, as is required when AND-drives-OR arrays 52 are used.

Figure 7:
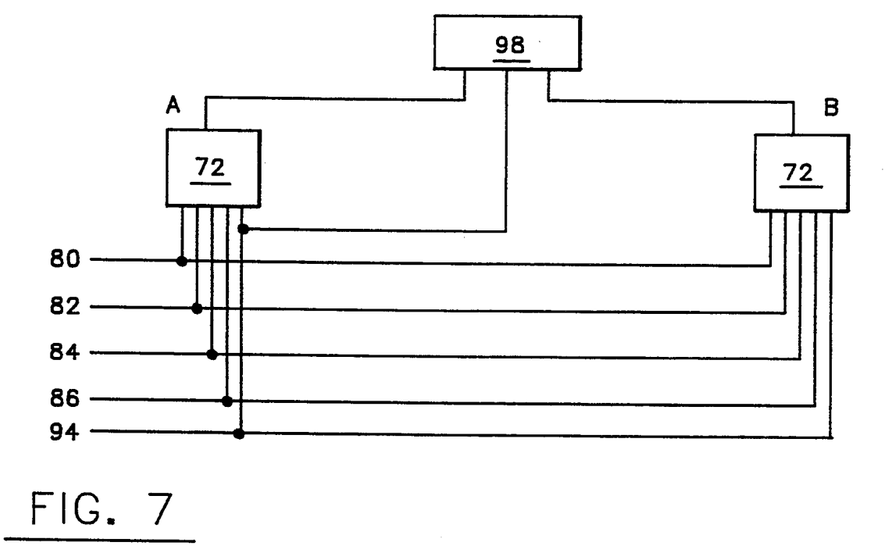
FIG. 7 shows a pair of FIG. 5 OR-drives-AND gate arrays driving an error handling device.

FIG. 7 shows a second duplicated embodiment of the present invention. Two identical OR-drives-AND arrays 72 (differentiated by the letters A and B) are jointly driven by operating inputs 80–86 and test input 94. An error handling device 98, which is the inverse of the error handling device 96 of FIG. 6, checks to make sure that the output of array A is the same as the output of array B, both in operation (0 applied to test input 94) and under test (1 applied to test input 94). Test input 94 also drives the error handline device 98. Error handling device 98 further checks to make sure that, when the arrays A and B are under test and produce the same output, that this output is a 1, as is required when OR-drives-AND arrays 72 are used.

Figure 8:
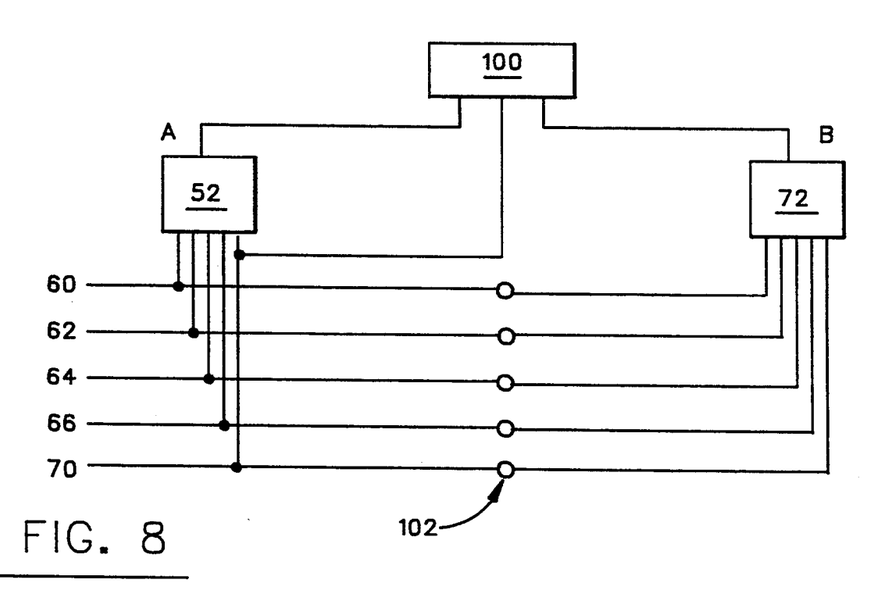
FIG. 8 shows an AND-drives-OR gate array of FIG. 4 and an OR-drives-AND gate array of FIG, 5 driving an error handling device.

FIG. 8 shows a third duplicated embodiment of the present invention. An AND-drives-OR array 52 (A) and an OR-drives-AND array 72 (B) are jointly driven by operating inputs 60–66 and test input 70. An error handling device 100, which is a combination of the error handling device 96 of FIG. 6 and the inverted error handling device 98 of FIG. 7, checks to make sure that the output of array A is the inverse of the output of array B, both in operation (1 applied to test input 70) and under test (0 applied to test input 70). Test input 70 also drives the error handling device 100. Error handling device 100 further checks to make sure that, when the arrays A and B are under test and produce opposite outputs, that this output is a 0 from the AND-drives-OR array 52 and a 1 from the OR-drives-AND array 72. Inverters 102 are placed in the inputs 60–66 and 70 before they are applied to array B, functionally converting them to the inputs 80–86 and 94 of FIG. 7. Arrays 52 and 72 may be reversed if desired.

Figure 9:
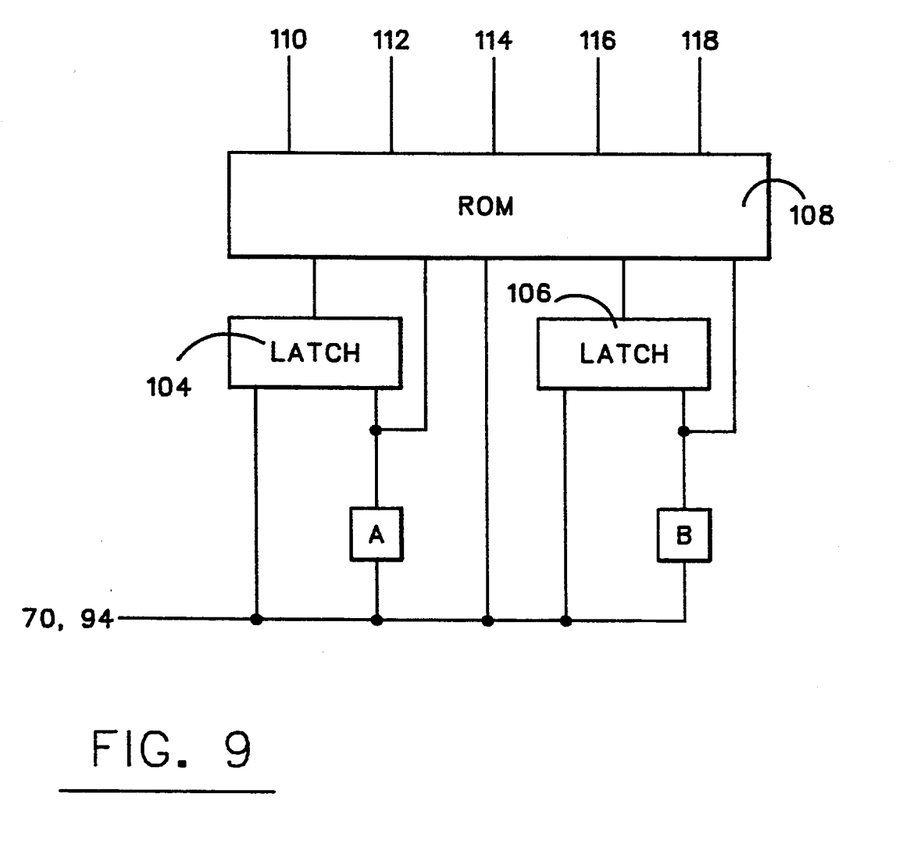
FIG. 9 is a schematic drawing of an error handling device.

FIG. 9 shows error handling devices 96-100 in greater detail. A test input 70 or 94 drives a first latch 104, array A, a second latch 106, array B, and a ROM 108. The ROM 108 is also driven by the first latch 106, array A, second latch 106, and array B. The operating inputs are omitted from FIG. 9 for clarity. If the arrays are inverses of each other, one of them includes an inverter where it receives the test input 70 or 94.

When under test, the outputs of arrays A and B are retained in latches 104 and 106, respectively. When the test signal is removed from test input 70 or 94, these test outputs are retained in latches 104 and 106 and are applied to the ROM 108 even as the operating outputs of arrays A and B are also applied to ROM 108. The removal of the test signal from the test input 70 or 94 strobes the ROM 108 to produce an output 110 indicating that all is well (or not well), an output 112 indicating what the correct output should be, an output 114 indicating the status of array A, an output 116 indicating the status of array B, an output 118 indicating the likely cause of the problem, etc.

If desired, operating results may be latched and the ROM 108 strobed on the application of the test signal, but this is not preferred. The ROM 108 may be replaced with a PLD, gate array, or any other input-output which can receive alternating test and operating array outputs as inputs and can produce the indicating outputs named.

Figure 10:
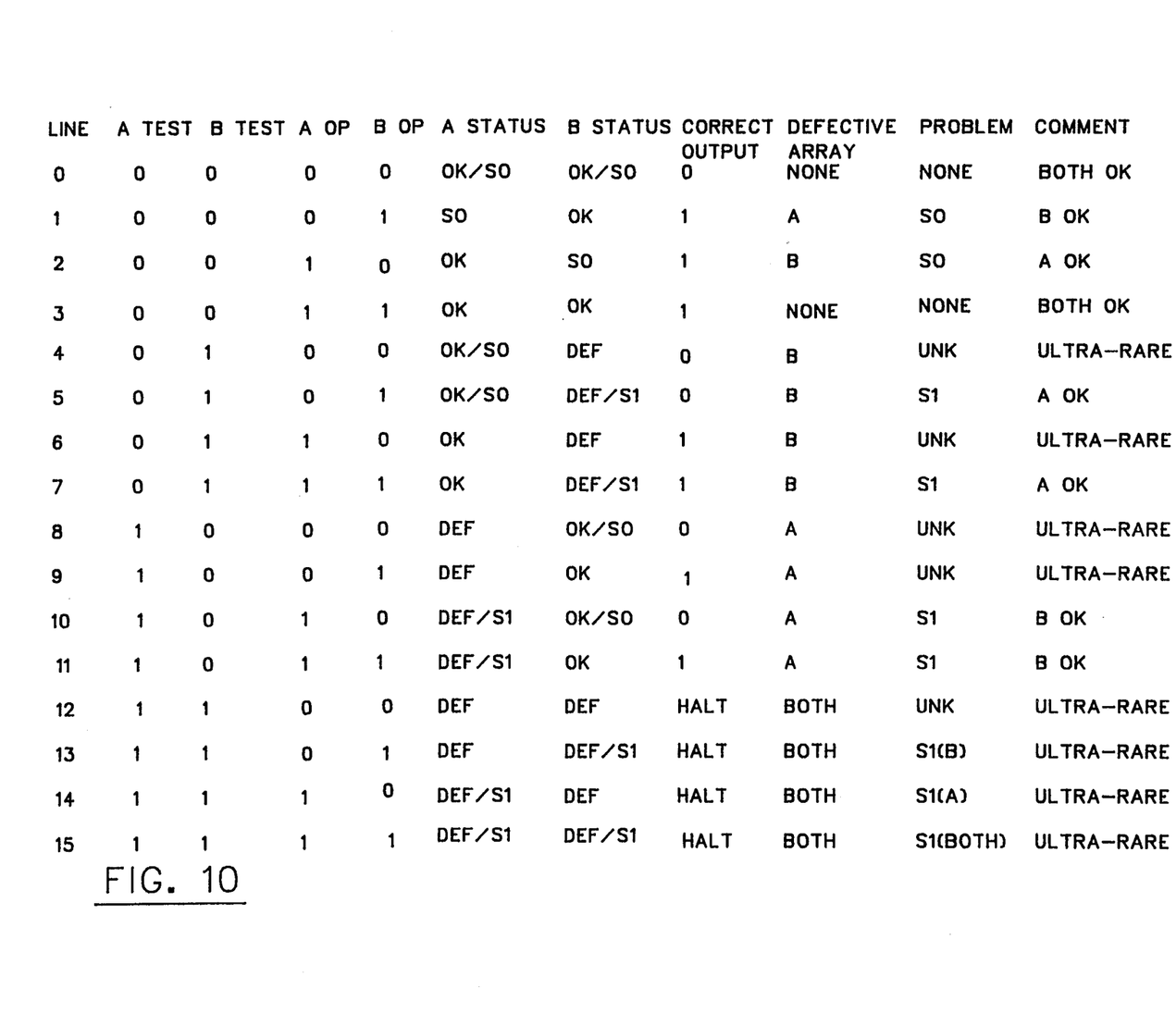
FIG. 10 is a truth table of the operation of an error handling device.

FIG. 10 is a truth table for the error handling device 96 of FIG. 6, which is driven by a pair of AND-drives-OR arrays 52. Comparable truth tables may be generated for error handling devices 98 and 100. FIG. 10 shows how the outputs of arrays A and B may be used to determine what the correct output should be, which array has failed (if either), and what the problem is with the defective array (if any). There being four possible input parameters (output of array A under test, output of array B under test, output of array A in operation, and output of array B in operation), there are 16 possible situations (lines 0–15).

FIG. 10 may be systematically constructed. Suppose that array A produces a 1 under test. This is shown in lines 8–15, where the value of the column A TEST is shown as 1. Array A certainly is defective (column A STATUS shows the value DEF), since it includes an AND gate producing a 1 in response to a 0 input. Array A probably is stuck at 1 (A STATUS shows DEF/S1) if it also produces a 1 in operation (i.e., lines 10–11 and 14–15, in which column A OP shows a value 1). The same reasoning applies to array B; column B STATUS shows DEF for lines 4–7 and 12–15, with a probable stuck at 1 (DEF/S1) for lines 5, 7, 13, and 15.

Now consider the opposite possibility, i.e., suppose that array A produces a 0 under test (lines 0–7). Array A may be OK or it may be stuck at 0 (OK/S0 in A STATUS). If array A produces a 1 in operation (see A OP, lines 2–3 and 6–7), then it wasn't stuck at 0, so it must be OK. If it produces a 0 in operation (lines 0–1, 4–5), then we must consider the output of array B.

Suppose (line 0) that A and B produce a 0, both under test and in operation. This indicates that A is either OK or stuck at 0 (A STATUS shows OK/S0), and no further conclusion can necessarily be drawn. The same is also true for array B. Since errors are so rare, however, we conclude that both arrays are OK. If, on the other hand (line 1), array B tests at 0 and operates at 1, then this indicates that array B is functional. The fact that array A does not also operate at 1 indicates that it is stuck at 0, and that the 0 produced under test is a false signal of reliability. A STATUS therefore shows S0.

Lines 4–5 are less revealing, since array B has shown its defectiveness by testing at 1. Array A both tests and operates at 0, and it is impossible to determine whether it is OK or stuck at 0. A STATUS therefore shows OK/S0.

This completes the construction of the A STATUS column. Since array A and array B are symmetrical, the B STATUS column can be constructed by reversing the A TEST and B TEST columns, and the A OP and B OP columns. The remaining columns may be constructed from these columns.

In many circumstances, the foregoing apparatus is ready to handle errors which are extremely unlikely to occur. It may be considerably simplified if these ultra-rare errors are disregarded. For example, if an array is defective, as indicated by the fact that it tests at 1, this most likely indicates that it is stuck on 1. It is ultra-rare for it to fail without indicating how it is sticking, that is, to test at 1 and operate at 0 (lines 4, 6, 8–9, and 13–14). It is even rarer for both of them to do so (line 12).

It is also ultra-rare for both arrays to fail, even in more conventional ways, such as both sticking at 1 (line 15). Likewise, if both appear to be stuck at 0 (line 1), the vastly more likely explanation is that both arrays are functioning well, both under test and in operation. Similarly, if one array is certainly defective and the other may or may not be defective (lines 4, 5, 8, and 10), the best explanation is that only one array is defective, and to accept the results of the other.

Figure 11:
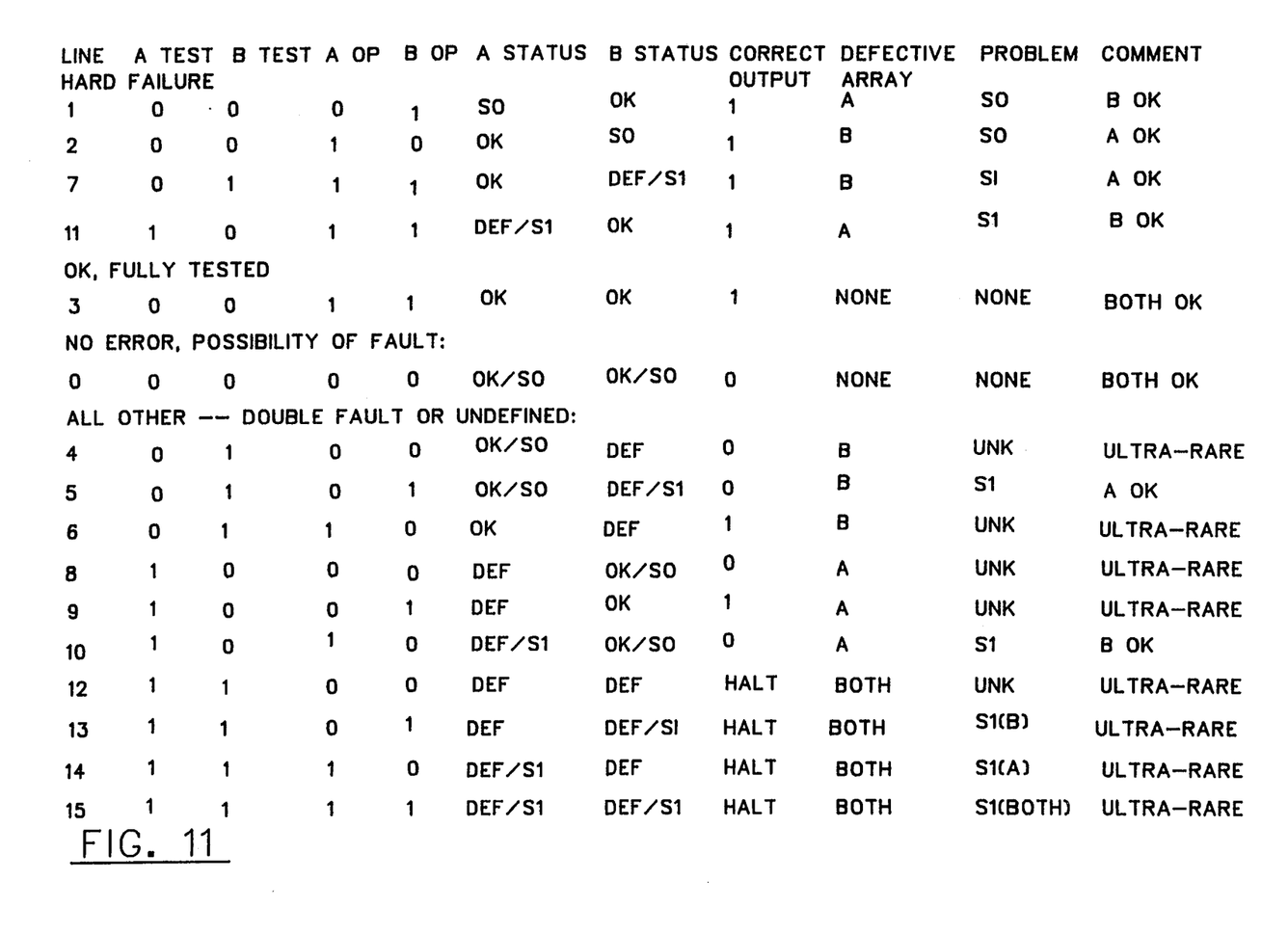
FIG. 11 is a reduced version of the truth table of FIG. 10.

Omitting the double fault or undefined possibilities, only six possibilities remain (lines 0–3, 7, and 11). This is shown in FIG. 11. If only these situations are of interest, the size of the ROM 108 may be more than halved.

Industrial Applicability

The present invention is capable of exploitation in industry, and can be used, whenever fault tolerance is desired in a gate array, without the necessity of triplecation. It can be made from materials and processes which, taken separate and apart from one another, are entirely conventional, or it can be made from their nonconventional analogs.

While several embodiments of the present invention have been disclosed in some detail, the true spirit and scope of the present invention is not limited thereto, but only by the limitations of the appended claims.

What is claimed is:

1. A fault tolerant gate array, comprising:
   (a) a first AND-drives-OR gate array and a second AND-drives-OR gate array identical to it, wherein:
      (1) each AND-drives-OR gate array includes at least one AND gate;
      (2) each AND gate includes a test input and at least one operating input;
      (3) each operating input of the first array is connected to a corresponding operating input of the second array; and
      (4) the test inputs of all of the AND gates are connected together; and
   (b) an error handling device comprising a first latch, a second latch, and an input-output device, wherein:
      (1) the first latch is connected to the test inputs and to the output of the first array, and is structured to receive and latch a signal from the first array when a signal of a first polarity is applied to the test inputs and to apply the latched signal to the input-output device when a signal of opposite polarity is applied to the test inputs;
      (2) the second latch is connected to the test inputs and to the output of the second array, and is structured to receive and latch a signal from the second array when a signal of the first polarity is applied to the test inputs and to apply the latched signal to the input-output device when a signal of opposite polarity is applied to the test inputs; and
      (3) the input-output device is connected to receive inputs from the first latch, the first array, the second latch, the second array, and the test inputs, and is constructed to produce an output when a signal of the first polarity applied to the test inputs is changed to a signal of opposite polarity.

2. The array of claim 1, wherein the input-output device comprises a ROM.

3. The array of claim 1, wherein the output produced by the input-output device comprises an indicator of the correct array output.

4. The array of claim 3, wherein the output produced by the input-output device further comprises an indicator of which array, if either, is defective.

5. The array of claim 4, wherein the output produced by the input-output device further comprises an indicator of the nature of the defect, if any.

6. A fault tolerant gate array, comprising:
   (a) a first OR-drives-AND gate array and a second OR-drives-AND gate array identical to it, wherein:
      (1) each OR-drives-AND gate array includes at least one OR gate;
      (2) each OR gate includes a test input and at least one operating input;
      (3) each operating input of the first array is connected to a corresponding operating input of the second array; and
      (4) the test inputs of all of the OR gates are connected together; and
   (b) an error handling device comprising a first latch, a second latch, and an input-output device, wherein:
      (1) the first latch is connected to the test inputs and to the output of the first array, and is structured to receive and latch a signal from the first array when a signal of a first polarity is applied to the test inputs and to apply the latched signal to the input-output device when a signal of opposite polarity is applied to the test inputs;
      (2) the second latch is connected to the test inputs and to the output of the second array, and is structured to receive and latch a signal from the second array when a signal of the first polarity is applied to the test inputs and to apply the latched signal to the input-output device when a signal of opposite polarity is applied to the test inputs; and
      (3) the input-output device is connected to receive inputs from the first latch, the first array, the second latch, the second array, and the test inputs, and is constructed to produce an output when a signal of the first polarity applied to the test inputs is changed to a signal of opposite polarity.

7. The array of claim 6, wherein the input-output device comprises a ROM.

8. The array of claim 6, wherein the output produced by the input-output device comprises an indicator of the correct array output.

9. The array of claim 8, wherein the output produced by the input-output device further comprises an indicator of which array, if either, is defective.

10. The array of claim 9, wherein the output produced by the input-output device further comprises an indicator of the nature of the defect, if any.

11. A fault tolerant gate array, comprising:
   (a) an OR-drives-AND gate array and an AND-drives-OR gate array inverted from it, wherein:
      (1) the OR-drives-AND gate array includes at least one OR gate;
      (2) each OR gate includes a test input and at least one operating input;
      (3) the test inputs of all of the OR gates are connected together;
      (4) the AND-drives-OR gate array includes at least one AND gate;
      (5) each AND gate includes a test input and at least one operating input;
      (6) the test inputs of all of the AND gates are connected together and, through an inverter, to the test inputs of the OR gates; and
      (7) each operating input of the first array is connected through an inverter to a corresponding operating input of the second array; and
   (b) an error handling device comprising a first latch, a second latch, and an input-output device, wherein:
      (1) the first latch is connected to the test inputs and to the output of the OR-drives-AND array, and is structured to receive and latch a signal from the OR-drives-AND array when a signal of a first polarity is applied to the test inputs of the OR-drives-AND array and to apply the latched signal to the input-output device when a signal of opposite polarity is applied to the test inputs;
      (2) the second latch is connected to the test inputs and to the output of the AND-drives-OR array, and is structured to receive and latch a signal from the AND-drives-OR array when a signal of opposite polarity is applied to the test inputs of the AND-drives-OR array and to apply the latched signal to the input-output device when a signal of the first polarity is applied to the test inputs; and
      (3) the input-output device is connected to receive inputs from the first latch, the OR-drives-AND array, the second latch, the AND-drives-OR array, and the test inputs, and is constructed to produce an output when a signal of the first polarity applied to the test inputs of the OR-drives-AND array is changed to a signal of opposite polarity.

12. The array of claim 11, wherein the input-output device comprises a ROM.

13. The array of claim 11, wherein the output produced by the input-output device comprises an indicator of the correct array output.

14. The array of claim 13, wherein the output produced by the input-output device further comprises an indicator of which array, if either, is defective.

15. The array of claim 14, wherein the output produced by the input-output device further comprises an indicator of the nature of the defect, if any.

* * * * *